United States Patent
Cachin et al.

(10) Patent No.: US 9,537,648 B2
(45) Date of Patent: Jan. 3, 2017

(54) DATA TRANSMISSION OVER PACKET SWITCHED NETWORK

(71) Applicant: ABB Technology AG, Zürich (CH)

(72) Inventors: Dominique Cachin, Winterthur (CH); Ramon Bächli, Untersiggenthal (CH); Alex Gygax, Rohr (CH); Hermann Spiess, Habsburg (CH)

(73) Assignee: ABB Schweiz AG, Baden (CH)

( * ) Notice: Subject to any disclaimer, the term of this patent is extended or adjusted under 35 U.S.C. 154(b) by 60 days.

(21) Appl. No.: 14/334,890

(22) Filed: Jul. 18, 2014

(65) Prior Publication Data

US 2014/0328356 A1 Nov. 6, 2014

Related U.S. Application Data

(63) Continuation of application No. PCT/EP2013/050998, filed on Jan. 21, 2013.

(30) Foreign Application Priority Data

Jan. 19, 2012 (EP) ..................................... 12151667

(51) Int. Cl.
*H04L 7/00* (2006.01)
*H02H 7/26* (2006.01)
*H04J 3/06* (2006.01)

(52) U.S. Cl.
CPC ............. *H04L 7/0008* (2013.01); *H04J 3/065* (2013.01); *H04L 7/0016* (2013.01); *H04L 7/0033* (2013.01); *H04L 7/0041* (2013.01); *H02H 7/261* (2013.01); *H04J 3/0638* (2013.01)

(58) Field of Classification Search
CPC ........ H04L 7/00; H04L 7/0008; H04L 7/0016; H04L 7/0033; H04L 7/0041; H04L 7/0037; H04L 12/2684; H04L 43/106; H04L 2012/5674
USPC .................................................. 370/203–520
See application file for complete search history.

(56) References Cited

U.S. PATENT DOCUMENTS

| | | | | |
|---|---|---|---|---|
| 5,381,408 A | * | 1/1995 | Brent ..................... | H04J 3/0632 370/517 |
| 6,985,499 B2 | * | 1/2006 | Elliot ..................... | H04J 3/0697 370/468 |
| 9,042,412 B2 | * | 5/2015 | Su ......................... | H02H 1/0061 370/519 |

(Continued)

OTHER PUBLICATIONS

International Search Report (PCT/ISA/210) mailed on Apr. 4, 2013, by the European Patent Office as the International Searching Authority for International Application No. PCT/EP2013/050998.

(Continued)

*Primary Examiner* — Warner Wong
(74) *Attorney, Agent, or Firm* — Taft Stettinius & Hollister LLP

(57) ABSTRACT

A method for transmitting measurement data includes receiving measurement data in a first communication module, time stamping the measurement data in the first module with a time tag, transmitting the measurement data to a second communication module via a packet switched data network, and outputting the transmitted measurement data after a predefined delay time $\Delta t_D$ after the time stamping of the measurement data.

18 Claims, 2 Drawing Sheets

(56) References Cited

U.S. PATENT DOCUMENTS

| | | | |
|---|---|---|---|
| 2008/0071482 A1 | 3/2008 | Zweigle et al. | |
| 2008/0075120 A1* | 3/2008 | Fourcand | H04J 3/0602 370/503 |
| 2008/0080567 A1* | 4/2008 | Radulescu | H04J 3/0664 370/516 |
| 2009/0088989 A1 | 4/2009 | Guzman-Casillas | |
| 2011/0261917 A1* | 10/2011 | Bedrosian | H04J 3/0667 375/371 |
| 2011/0274124 A1* | 11/2011 | Tosti | H04J 3/0667 370/503 |
| 2013/0096854 A1* | 4/2013 | Schweitzer, III | G01R 31/085 702/59 |
| 2013/0202291 A1* | 8/2013 | Cavaliere | H04B 10/07 398/33 |
| 2014/0029604 A1* | 1/2014 | Nicholls | H04W 56/0015 370/350 |

OTHER PUBLICATIONS

Written Opinion (PCT/ISA/237) mailed on Apr. 4, 2013, by the European Patent Office as the International Searching Authority for International Application No. PCT/EP2013/050998.

European Search Report mailed on Jul. 17, 2012 for European Application No. 12151667.8.

Warren A Montgomery, Techniques for Packet Voice Synchronization, IEEE Journal on Selected Areas in Communications, vol. SAC-1, No. 6, Dec. 1983.

* cited by examiner

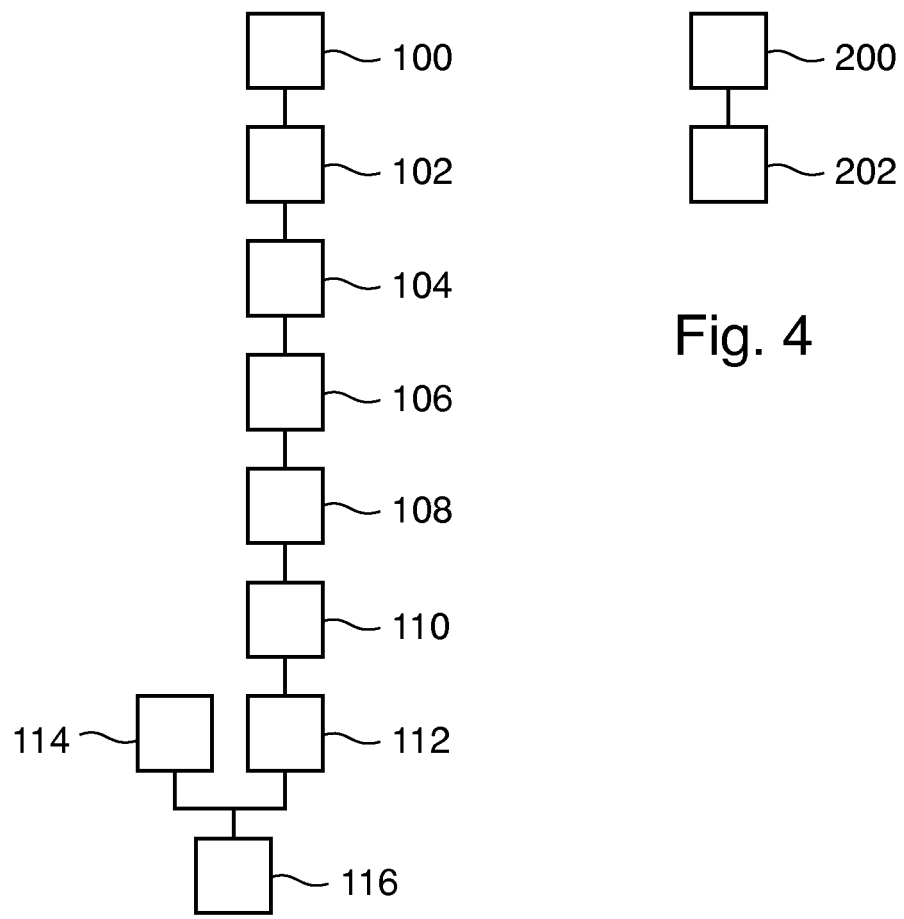

DATA TRANSMISSION OVER PACKET SWITCHED NETWORK

RELATED APPLICATION

This application claims priority as a continuation application under 35 U.S.C. §120 to PCT/EP2013050998, which was filed as an International Application on Jan. 21, 2013 designating the U.S., and which claims priority to European Application 12151667.8 filed in Europe on Jan. 19, 2012. The entire contents of these applications are hereby incorporated by reference in their entireties.

FIELD

The present disclosure relates to the field of data transmission in electric power systems. More particularly, the present disclosure relates to the transmission of data over a packet switched data network between time-synchronized communication modules.

BACKGROUND INFORMATION

In line differential protection, an electrical power line is protected by two line differential protection relays placed at two distant locations or ends of the power line. By comparing phase information of the current in the power line at the different locations, a differential protection relay may detect critical situations on the power line like short circuits and may isolate the power line from the electrical grid before damage to the electrical equipment will occur.

At each of the different locations of the power line, a measurement device is located that measures the actual current through the power line. The data of each measurement device may then be sent to the differential protection relay, which compares data from different measurement devices, for example, to determine a phase shift between the two currents at two different points of the power line. Here, a problem arises that data measured at the same time needs to be compared, and that a protection relay may therefore need to know the time delays caused by the communication link.

In many cases, electric power utilities use circuit switched SDH (Synchronous Digital Hierarchy) or SONET (Synchronous Optical Network) networks for wide area communication of mission critical operational data like teleprotection signalling or SCADA control and supervision data. Alternatively, data communication between distant locations of an electrical utility may rely on packet switched data networks like Ethernet. However, packet switched data networks may have a variable packet latency, or packet delay variation, for example, the transmission times of packets sent from a first device to a second device may vary over time. Furthermore, the transmission time of a packet sent from a first device to a second device may differ from a transmission time of a packet sent from the second device to a first device. Hence, synchronizing data transmitted over a packet switched network may prove difficult.

An article by W. A. Montgomery entitled "Techniques for Packet Voice Synchronization", IEEE Journal Vol. SAC-1 No. 6, December 1983, describes ways to transmit packetized voice over a packet switched network and to reconstruct a continuous stream of speech from a set of packets arriving with varying transit delay and even out of order. In long-haul networks, the propagation delay may exceed 100 ms, while significant inter-packet delay variation is caused by packet queuing in the switches. In an embodiment deemed disadvantageous for cost reasons, packet sender and receiver are synchronized to the same absolute time reference, and each packet carries an indication of its production time. For an arriving packet, a target play-out time is determined as a fixed interval after the packet production time. Synchronization of the clocks at the sender and receiver involves a reliable separate channel with known propagation delays.

SUMMARY

An exemplary embodiment of the present disclosure provides a method of transmitting data over a packet switched data network between time-synchronized communication modules. The exemplary method includes receiving synchronous time division multiplex (TDM) data in a first communication module, and generating, by the first module, a time stamp indicative of a receive time of the synchronous TDM data at the first module. The exemplary method also includes transmitting, in a data packet, the received synchronous TDM data to a second communication module via the packet switched data network, and outputting, by the second module, the transmitted synchronous TDM data at an output time determined by adding a predefined delay time to the time stamp.

An exemplary embodiment of the present disclosure provides a non-transitory computer-readable recording medium having a computer program recorded thereon that, when executed by a processor of a destination communication module configured to exchange data packets with a source communication module over a packet switched data network, the destination and source communication modules being time-synchronized, causes the destination communication module to execute a method of transmitting data over the packet switched data network. The method includes outputting, at an output time, synchronous time division multiplex (TDM) data transmitted in a data packet from the source module. The output time is determined by adding a predefined delay time to a time stamp generated by the source module and indicative of a receive time of synchronous TDM data at the source module.

An exemplary embodiment of the present disclosure provides a destination communication module configured to exchange data packets with a source communication module over a packet switched data network. The communication modules are time-synchronized. The destination module includes at least one hardware processor circuit configured to output, at an output time, synchronous TDM data transmitted in a data packet from the source module. The output time is determined by adding a predefined delay time to a time stamp generated by the source module and indicative of a receive time of synchronous TDM data at the source module.

BRIEF DESCRIPTION OF DRAWINGS

Additional refinements, advantages and features of the present disclosure are described in more detail below with reference to exemplary embodiments illustrated in the drawings.

FIG. 3 shows a flow diagram for a method of transmitting data according to an exemplary embodiment of the present disclosure.

FIG. 4 shows a flow diagram for a method of synchronizing communication modules according to an exemplary embodiment of the present disclosure.

In principle, identical parts are provided with the same reference symbols in the figures.

DETAILED DESCRIPTION

Figure 1:
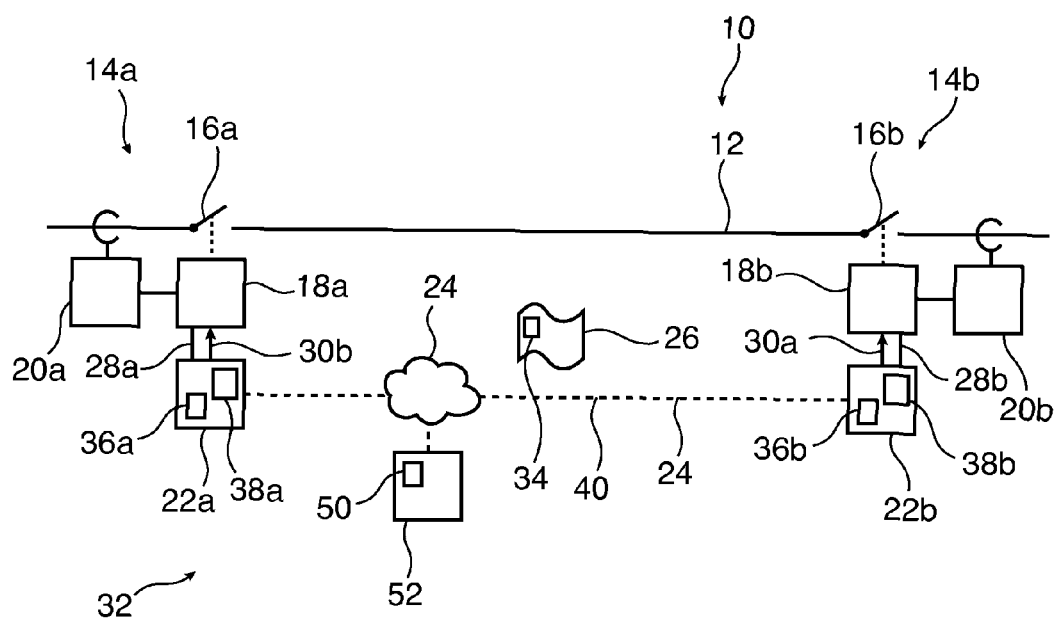
FIG. 1 schematically shows an electrical power system according to an exemplary embodiment of the present disclosure.

Exemplary embodiments of the present disclosure use packet switched communication networks for transmitting synchronous Time Division Multiplex (TDM) data to a remote line differential protection relay.

An exemplary embodiment of the present disclosure provides a method of transmitting data over a packet switched data network between time-synchronized communication modules.

According to an exemplary embodiment of the present disclosure, the method includes the steps of: receiving synchronous TDM data in a first, or source, communication module; generating a time stamp at the first module, the time stamp being indicative of a receive time of the synchronous TDM data at the first module, for example of the receive time of a first bit of a sequence of bits to be subsequently packed into a data packet; transmitting the received quantity of data in a data packet to a second, or destination, communication module via a packet switched data network; and outputting the transmitted data in synchronous form, by the second module, after the lapse of a predefined time delay following the receive time of the data at the first module. In short, the method emulates a circuit switched communication link with a predefined and controllable delay between a source and a destination of the synchronous TDM data.

The time stamp is generated from a first clock of the first communication module that is synchronized to a second clock at the second module. The predefined time delay, or delay time, has a constant value at least for a certain period of time, and may be configured and eventually adapted by an operator or an automated adaptation mechanism. An actual output time at the second module may be determined by the first module, in which case the output time is transmitted to the second module along with the data, or by the second module based on the time stamp transmitted from the first module.

In accordance with an exemplary embodiment, the present disclosure is applied to communication of continuous measurement data, or to control or protection data for the benefit of an electric power transmission system or the operating utility, respectively. According to an exemplary embodiment, for the purpose of line differential protection of a power line, the second module is connected to a line differential protection relay to which the output data is provided and which controls a switch for interrupting the power line. Standard line differential protection relays are designed for receiving a synchronous TDM data stream with constant time delay, and thus need not be replaced when used in conjunction with a communication link to a remote line differential protection relay which is established via packet switched network hardware according to the present disclosure.

In accordance with an exemplary embodiment of the present disclosure, a transmission time is calculated at the second module based on a difference between the time stamp and a clock time of a second clock of the second communication module that is indicative of a packet receive time at the second module. After waiting for a wait time based on the difference between the transmission time and a predefined delay time, the second communication module may output the transmitted data. The act of waiting or delaying the output may be achieved, for example, by writing, at the second module, the transmitted data to an appropriate position of a jitter output buffer.

An exemplary embodiment of the present disclosure relate to a non-transitory computer-readable recording medium having a computer program recorded thereon that, when executed by a processor or FPGA of a computer processing device (e.g. a computer such as a desktop, laptop, tablet computer or other mobile computer processing device including smartphones, etc.), is configured to carry out steps of the method as described herein for transmitting data over a packet switched data network.

A non-transitory computer-readable recording medium may be a floppy disk, a hard disk, an USB (Universal Serial Bus) storage device, a RAM (Random Access Memory), a ROM (Read Only memory), an EPROM (Erasable Programmable Read Only Memory) and a FLASH memory. In accordance with an exemplary embodiment, the computer program may be downloaded from a data communication network (e.g. the Internet) which allows for downloading a program code, and the computer program may then be tangibly recorded on the computer-readable medium.

An exemplary embodiment of the present disclosure provides a destination, or second, communication module, for example, a communication module connected to a protection relay of an electric power system. The communication module may be part of the protection relay or may be a separate device communicatively connected to the protection relay. The first and second communication modules are described herein with respect to the features in which they are configured to perform. It is to be understood that each of the first and second modules are discrete hardware circuitry having one or more processors (general purpose or application specific) that execute a computer program or computer-readable instructions tangibly recorded on a non-transitory computer-readable recording medium to carry out the operative functions of the respective modules as described herein.

According to an exemplary embodiment of the present disclosure, the destination communication module is configured for executing the method as described herein. For example, the destination communication module may be configured for receiving transmitted data from a source, or first, communication module via the packet switched data network. The communication module may be configured to output the transmitted data following expiry of a predefined time delay after a time stamping of the data in the source communication module.

An exemplary embodiment of the present disclosure provides a communication system for an electrical power system, which includes at least two such communication modules that are interconnected by a packet switched data network.

According to an exemplary embodiment of the present disclosure, the communication system is configured for executing the method as described herein. Such a communication system may be configured for providing synchronous TDM data with a predefined delay time to a remote protection relay.

These and other aspects of the present disclosure will be apparent from and elucidated with reference to the exemplary embodiments described hereinafter with reference to the drawings.

FIG. 1 shows an electrical power system 10 with a power line 12. In the power line 12, two protection relays 18a, 18b are situated at remote locations or substations 14a, 14b. It may be possible that the two protection relays 18a, 18b are more than ten or even more than a hundred kilometers distant from each other.

Each protection relay 18a, 18b controls a switch 16a, 16b for interrupting the power line 12. For example, the power line 12 may be disconnected from a power grid with one of the switches 16a, 16b.

Furthermore, each protection relay 18a, 18b is connected to a measurement module 20a, 20b for measuring a current in the power line 12 and a communication module 22a, 22b for data communication with further equipment of the electric power system 10.

The two protection relays 18a, 18b are interconnected for data communication via a packet switched data network 24, which, for example, may be an Ethernet, or IP, or MPLS network. In particular, the communication modules 22a, 22b may exchange data packets 26 with each other.

For example, the measurement module 20a may generate continuous measurement data, which is provided to protection relay 18a for processing, and subsequently received as synchronous TDM measurement data 28a in the first communication module 22a and stored in data packets 26. The first communication module 22a may transmit the data packets 26 via the data network 24 to the second communication module 22b, which extracts the transmitted synchronous TDM measurement data 30a from the data packets 26 and outputs the data in a continuous data stream to the protection relay 18b.

The protection relay 18b may be configured for receiving measurement data from the measurement module 20b and may compare the transmitted measurement data 30a with the former data for retrieving phase difference information between the measured currents at the two locations of the measurement modules 20a, 20b.

It has to be noted that the protection relays 18a, 18b may be equally designed and that the data exchange and the processing of the data may be completely symmetric. For example, synchronous TDM data 28b from the protection relay 18b may be transmitted to the protection relay 18a and may be output as transmitted synchronous TDM data 30b.

Since the transmission of the data packet 26 via the data network 24 needs time, the transmitted measurement data 30a is delayed with respect to measurement data that has been measured by the measurement module 20b at the same time as the measurement module 20a has measured the measurement data 28a.

The protection relays 18a, 18b may be configured so that it assumes that the transmitted measurement data 30a, 30b has a constant time delay with respect to the local measurement at the measurement module 20a, 20b.

Since the data network 24 is packet switched, the transmission time of the data packet 26 between the two communication modules 22a, 22b may vary over time and may also be asymmetric with respect to the direction of the transmission. For example, the transmission time of a data packet 26 sent from communication module 22a to the communication module 22b may differ from a transmission time of a data packet 26 sent from the communication module 22b to the communication module 22a. The non-constant transmission times of the data packets 26 may also be called packet delay variation.

The communication system 32 (including the communication modules 22a, 22b and the data network 24) is able to compensate for this variable jitter as will be explained in the following.

To achieve this, the communication module 22a stores a time stamp or tag 34 in the data packet 26. The time tag 34 may be generated from the clock time of a local clock 36a of the communication module 22a. After receiving the data packet 26, the communication module 22b calculates the transmission time of the specific transmission of the data packet 26 and waits until a predefined delay time has elapsed before the transmitted measurement data 30a is output to the protection relay 18b. During the wait time, the data packet 26 and/or the measurement data 28a may be stored in a jitter buffer 38b of the communication module 22b. (Also, the communication module 22a may have a jitter buffer 38a for storing data packets 26 from the communication module 22b).

Figure 2:
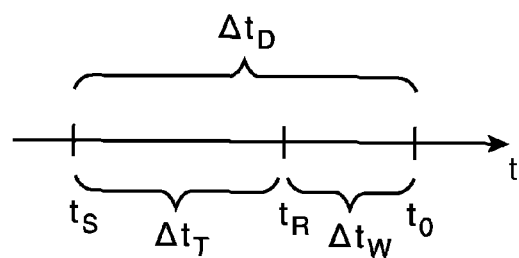
FIG. 2 shows a diagram with time delays according to an exemplary embodiment of the present disclosure.

FIG. 2 shows a diagram with the different times that may be used during this calculation.

At time point $t_S$, the data 28a is stored in the data packet and time stamped with the time tag 34. At time point $t_R$, the data 28a is received at the second communication module 22b and at time point $t_O$, the transmitted data 30a is output to the protection relay 18b.

The communication module 22b calculates the transmission time $\Delta t_T$ as a difference between the time points $t_R$ and $t_S$ and the wait time $\Delta t_W$ as a difference between the predefined delay time $\Delta t_D$ and the transmission time $\Delta t_T$. The time point $t_R$ is determined based on the clock time of the local clock 36b of the second communication module 22b.

FIG. 3 shows a method of transmitting data that will be explained with reference to FIGS. 1 and 2.

In step 100, the first measurement module 20a generates first measurement data by measuring a first current at first location of the power line 12.

In step 102, the measurement data is processed or handled at the protection relay 18a and subsequently received in the first communication module 22a as synchronous TDM measurement data 28a. The first communication module 22a writes the synchronous TDM measurement data 28a in the data packet 26.

For example, some 0.125 µs to several ms of synchronous TDM data 28a are packet into an Ethernet, IP or MPLS packet 26 as payload.

In step 104, the communication module 22a time stamps the first measurement data 28a with a time tag 34. The time tag 34 is generated with the actual clock time of the first clock 36a. The time tag 34 may be stored in the data packet 26. For example, a time tag 34 indicating the time of day information at which the first bit of the data 28a in the packet 26 was received in the communication module 22a is additionally packed into the Ethernet, IP or MPLS packet as part of the payload.

In step 106, the data packet 26 and in particular the first measurement data 28a and the time tag 34 are transmitted to the second communication module 22b via the packet switched data network 24.

In step 108, the data packet 26 is received in the second communication module 22b. The second communication module 22b may extract the first measurement data 28a and the time tag 34 from the data packet 26.

Furthermore, the second communication module 22b calculates the transmission time $\Delta t_T$ and the wait time $\Delta t_W$ from the time tag 34. The transmission time $\Delta t_T$ is calculated based on a difference between an actual clock time of the second clock 36b and the time tag 34 in the second communication module 22b. The wait time $\Delta t_W$ is calculated based on a difference between the predefined delay time $\Delta t_D$ and the transmission time $\Delta t_T$.

In step 110, the communication module 22b stores the transmitted measurement data 30a in a jitter buffer 38b of the second communication module 22b and waits for the calculated wait time $\Delta t_W$. In such a way, the communication module 22b delays the outputting of the transmitted measurement data 30a for the wait time $\Delta t_W$.

In step 112, the second communication module 22b outputs the transmitted measurement data 30a at the predefined delay time $\Delta t_D$ after the time stamping of the synchronous TDM measurement data 28a. The transmitted measurement data 30a may comprise the measured values of the measurement of the current at the measurement module 20a.

In particular, the transmitted measurement data 30a is output to the protection relay 18b.

Summarized, the measurement data 28a sent off at the time point $t_S$ is output at a time point $t_O$, which is controlled to be a predefined delay time $\Delta t_D$ after the time point $t_S$. In such a way, the method may be seen as circuit emulation over the packet switched network 24, for example for the application of line differential protection, or the communication system 32 may be seen as including an emulated circuit switched communication link 40.

Thus, the method may provide a circuit emulation service over an Ethernet based wide area communication network 24, which is suitable for the application of line differential protection.

For example, the Ethernet, IP or MPLS packet 26 containing the measurement data 28a of a particular time interval, which may have been received by the communication module 22a via a synchronous communication link, is transferred to the destination node, e.g., the communication module 22b, of the circuit emulation service. In the communication module 22b, the measurement data 28a may be serialized again and placed in the jitter buffer 38b. The jitter buffer 38b may be used for compensating communication delay variations on the packet switched network 24. Using a synchronized frequency to read out the data bits, a synchronous TDM signal 30a may be regenerated, which may be emulated via the packet switches network 24 and low resulting jitter and wander values may be guaranteed.

The information of the additionally transmitted time tag 34 may be used to control the delay of the emulated circuit 40 with high accuracy. By means of the time tag 34, the receiving node of the circuit emulation service (e.g. the second communication module 22b) may get the exact absolute time when the first bit of a particular data interval of the measurement data 28a has arrived at the sending node of the circuit emulation service (e.g., the communication module 22a).

It has to be noted that several technologies are available which may support an emulation of circuit switched lines over packet switched networks, such as, for example, circuit emulation service over packet CESoP. These technologies may support low packet delay variation and thus low asymmetrical communication delay of synchronous TDM signals, when combined with highly accurate synchronization of the communication network elements, for example, synchronous Ethernet Sync-E or when combined with a point to point communication path through a packet switched network with reserved bandwidth and guaranteed priority for a particular communication service, such as multiprotocol label switch (MPLS), for example.

However, in the case of an asymmetrical communication delay between the modules 22a, 22b only the method as described herein may be suitable to achieve the requirements on the data synchronization that are usually required by line differential protection.

In step 114, the measurement module 20b generates second measurement data by measuring a second current at second location of the power line 12. The second measurement data is provided to the protection relay 18b.

When the two measurements of the measurement modules 20a, 20b are performed at the same time, the arrival times of the corresponding measurement data at the protection relay 18b have a predefined delay time $\Delta t_D$ relative to each other.

In step 116, the protection relay 18b processes the measurement data in such a way that measurements at equal time points are compared. The protection relay 18b is aware of the constant delay time $\Delta t_D$ and shifts the transmitted measurement data 30a accordingly. For example, phase information of two different points of the power line 12 may be compared and line differential protection may be performed between the line protection relays 18a and 18b.

The two protection relays 18a, 18b may time-wise correlate the measurement data 30a, 30b from the remote end with the local measurement data by compensating a known, fix and jitter free delay between local measurement data and remote measurement data 30a, 30b.

The emulated circuit switched communication link 40 for line differential protection may exhibit the following properties.

The communication link 40 has a fixed communication delay $\Delta t_D$ of not more than 10 ms per direction. This may be motivated by the requirement on the protection application in the protection relay 18a, 18b to react within certain time limits to faults on the protected power line 12.

The communication link 40 adds low jitter to the current measurement values in the measurement data 28a, 28b, transmitted over the communication link 40.

The communication link 40 has a differential delay between the two communication directions that is not more than 160 μs. A requirement of 160 μs may be motivated by a target of the line differential protection to detect phase errors of as low as 3° which corresponds to about 160 μs in a 50 Hz power grid.

FIG. 4 shows a flow diagram for a method for synchronizing the clocks 36a, 36b of the communication modules 22a, and 22b. The method of FIG. 4 may be executed prior to the method of FIG. 3.

For the circuit emulation service over the packet switched network 24 suitable for the application of line differential protection, not only a precise frequency synchronization of two communication modules 22a, 22b may be required in order to keep the jitter (and wander, 'slow jitter') of the communication link 40 low, but additionally a precise time of day synchronization of the communication modules 22a, 22b may be required in order to precisely control the communication delay of the communication link 40 in each direction. Assuming that the communication delay in each direction can be adjusted with an accuracy of 160 μs/2=80 μs per direction, the resulting asymmetrical delay between the two directions is well controlled to be within the above limit of 160 μs.

These requirements may be met by synchronizing the local clocks 36a, 38b with a global master clock 50. As is indicated in FIG. 1, a further device 52 connected to the packet switched data network 24 may comprise the master clock 50.

In step 200, the first clock 36a of the first communication module 22a is synchronized with a master clock 50 via the packet switched data network 24.

In step 202, the second clock 36b of the second communication module 22b is synchronized with the master clock 50 via the packet switched data network 24.

In such a way, the first clock 36a used for generating the time tag 34 and the second clock 36b used for calculating the delay time $\Delta t_T$ may be synchronized with high accuracy.

For the synchronization of the clocks 36, 36b, 50, the time and frequency synchronization protocol according IEEE 1588v2, also called precision time protocol (PTP) may be used, in order to achieve a frequency and time synchronization of all communication nodes, i.e. communication modules 22a, 22b, 52 in the communication network 24.

If all network nodes, i.e. communication modules 22a, 22b, and 52 implement, for example, a profile according to IEEE C37.238—power profile—of IEEE 1588v2, the uncertainty in synchronization per single network node 22a, 22b, 52 may be not more than 50 ns. In other words, a data network 24 comprising 200 communication nodes may still achieves a synchronization error which is not more than 10 µs. This may be sufficient in order to achieve a point to point circuit emulation service, which has the required accuracy in path delay adjustment.

The synchronous TDM measurement data 28a, which is received in the communication module 22a, which forms a starting point of the circuit emulation line 40 over the packet switched network 24, may then be time stamped with high accuracy, using the local clock 36a that is synchronized via the data network 24 with IEEE 1588v2.

Using the local clock 36b that may be also synchronized to the same IEEE 1588v2 master clock 50 like the clock 36a, the receiving node, e.g., the communication module 22b, of the circuit emulation service may then delay the regeneration of the synchronous transmitted measurement data 30a, such that a predefined communication delay $\Delta t_D$ is met with high accuracy.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art and practising the claimed disclosure, from a study of the drawings, the present disclosure, and the appended claims. In the claims, the word "comprising" or "including" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of transmitting data over a packet switched data network between time-synchronized communication modules, the method comprising:
    receiving synchronous time division multiplex (TDM) data in a first communication module;
    generating, by the first module, a time stamp indicative of a receive time of the synchronous TDM data at the first module;
    transmitting, in a data packet, the received synchronous TDM data to a second communication module via the packet switched data network;
    outputting, by the second module, the transmitted synchronous TDM data at an output time determined by adding a predefined delay time to the time stamp;
    calculating, by the second communication module, a transmission time based on a difference between a packet receive time of the data packet at the second module and the time stamp;
    calculating a wait time as a difference between the predefined delay time and the transmission time; and
    delaying the outputting of the transmitted synchronous TDM data for the wait time.

2. The method of claim 1, comprising:
    storing the transmitted synchronous TDM data in a jitter buffer of the second communication module for the wait time.

3. A destination communication module configured to exchange data packets with a source communication module over a packet switched data network, wherein the communication modules are time-synchronized, the destination module having at least one hardware processor circuit configured to:
    output, at an output time, synchronous TDM data transmitted in a data packet from the source module,
    wherein the output time is determined by adding a predefined delay time to a time stamp generated by the source module and indicative of a receive time of synchronous TDM data at the source module, and
    wherein the processor of the destination communication module is configured to
    calculate a transmission time based on a difference between a packet receive time of the data packet at the destination module and the time stamp;
    calculate a wait time as a difference between the predefined delay time and the transmission time; and
    delay the outputting of the transmitted synchronous TDM data for the wait time.

4. The method of claim 1, comprising:
    determining, by the second module, the output time for the transmitted synchronous TDM data.

5. The method of claim 1, comprising:
    determining, by the first module, the output time, and transmitting the output time in the data packet to the second module.

6. The method of claim 1, comprising:
    transmitting the time stamp in the data packet to the second module.

7. The method of claim 1, comprising:
    synchronizing a first clock of the first communication module with a master clock, the first clock being used for time stamping the synchronous TDM data;
    synchronizing a second clock of the second communication module with the master clock,
    wherein the first clock and the second clock are synchronized via the packet switched data network with the master clock.

8. The method of claim 7, wherein one of the first clock or the second clock acts as the master clock.

9. The method of claim 8, wherein for synchronization the precision time protocol (PTP) according to time and frequency synchronization protocol IEEE 1588v2 is used.

10. The method of claim 1, wherein the predefined delay time has a constant value in a period of time.

11. The method of claim 10, wherein the constant value is adapted by an operator.

12. The method of claim 10, wherein the constant value is adapted by an automated mechanism.

13. The method of claim 1, wherein:
the communication modules are nodes of a communication network of an electric power system;
the synchronous TDM data include measurement data;
the predefined delay time is less than 10 ms; and
the method comprises providing, by the second communication module, the transmitted synchronous TDM data to a line differential protection relay configured to protect a power line of the power system.

14. The method of claim 13, wherein a communication link for the synchronous TDM data including the two communication modules and the packet switched data network has a communication delay accuracy of better than 80 µs per direction.

15. The method of claim 13, wherein the line differential protection relay is designed to receive synchronous TDM data with a constant time delay.

16. The method of claim 13, wherein:
the line differential protection relay processes the measurement data and another measurement data from a second location on the power line, the line differential protection relay comparing measurements at equal time points, and
the line differential protection relay shifts the synchronous TDM data by the predefined delay time.

17. The method of claim 16, wherein the line differential protection relay is designed to receive synchronous TDM data with a constant time delay.

18. The method of claim 17, comprising:
transmitting the time stamp in the data packet to the second module;
synchronizing a first clock of the first communication module with a master clock, the first clock being used for time stamping the synchronous TDM data;
synchronizing a second clock of the second communication module with the master clock,
wherein the first clock and the second clock are synchronized via the packet switched data network with the master clock;
wherein the predefined delay time has a constant value in a period of time; and
wherein the constant value is adapted by an operator.

* * * * *